United States Patent
Chien

(10) Patent No.: US 6,597,554 B2
(45) Date of Patent: Jul. 22, 2003

(54) OVERVOLTAGE PROTECTOR OF A BURN-IN BOARD

(75) Inventor: Tze-Zen Chien, Pingtung (TW)

(73) Assignee: Winbond Electronics Corp., Hsinchu (TW)

( * ) Notice: Subject to any disclaimer, the term of this patent is extended or adjusted under 35 U.S.C. 154(b) by 320 days.

(21) Appl. No.: 09/815,803

(22) Filed: Mar. 23, 2001

(65) Prior Publication Data

US 2002/0101697 A1 Aug. 1, 2002

(30) Foreign Application Priority Data

Jan. 29, 2001 (TW) ...................................... 90201456 U

(51) Int. Cl.[7] .............................. H02H 3/20; H02H 3/22
(52) U.S. Cl. ...................................... 361/91.1; 361/111
(58) Field of Search ........................... 361/91.1, 56, 89, 361/110, 111, 119, 120

(56) References Cited

U.S. PATENT DOCUMENTS

| | | | | | |
|---|---|---|---|---|---|
| 3,633,047 A | * | 1/1972 | Kadah | ................... | 327/381 |
| 3,793,535 A | * | 2/1974 | Chowdhuri | ................ | 361/111 |
| 4,234,917 A | * | 11/1980 | Suzuki et al. | ............. | 363/160 |
| 4,571,656 A | * | 2/1986 | Ruckman | ................. | 361/56 |

* cited by examiner

Primary Examiner—Rajnikant B. Patel
(74) Attorney, Agent, or Firm—J.C. Patents

(57) ABSTRACT

An overvoltage protector of a burn-in board. The overvoltage protector has a fuse, a first capacitor, a gate controlling switch, a resistor and a second capacitor. The overvoltage protector uses the resistor and the gate controlling switch to set and control a voltage value, which is used to control a direct voltage of an output and protect the IC on the burn-in board from damage.

9 Claims, 2 Drawing Sheets

20

OVERVOLTAGE PROTECTOR OF A BURN-IN BOARD

CROSS-REFERENCE TO RELATED APPLICATION

This application claims the priority benefit of Taiwan application Ser. No. 90201456, filed Jan. 29, 2001.

BACKGROUND OF THE INVENTION

1. Field of Invention

The present invention relates generally to an overvoltage protector. More particularly, the present invention relates to an overvoltage protector of a burn-in board.

2. Description of the Related Art

FIG. 1 is a circuit diagram of a conventional overvoltage protector of a burn-in board. The conventional overvoltage protector 10 utilizes a zener and a fuse to protect the circuit. When a value of a voltage $V_{in}$ is higher than the value of the zener 12, the zener 12 will be damaged to cause a short circuit. At the same time, a high short circuit current flows into the zener 12 and the fuse 14, because the short circuit current is higher than a current limit of the fuse 14. Thus, the fuse will burn and break. Thus, no voltage will be able to flow through the circuit in order to protect the IC of the burn-in board from damage.

However, the conventional overvoltage protector can only be set at certain a voltage value, for example 3.3V or 5.1V. These values limit the utilization of the overvoltage protector. If 4.3V of output voltage $V_o$ is transmitted through the circuit and the value is not the same as the set value, then the zener will not be able to perform its protection function. If a driving device that transmits the input voltage $V_{in}$ is affected by some factors such as an unstable power transmission, the output voltage $V_o$ also will be affected, which can lead to damage of the IC on the burn-in board.

If the conventional overvoltage protector is utilized in a laboratory, some experiments can cause the circuit to short easily, for example a high temperature operation life (HTOL) test, a low temperature operation life (LTOL) test, a high temperature bias life (HTBL) test, a temperature humidity bias (THB) test and a high accelerated stress test (HAST). The sudden short circuit can cause the experiments to repeat. Thus the reliability of the IC and the overvoltage protector is reduced.

SUMMARY OF THE INVENTION

It is an object of the present invention to provide an overvoltage protector of a burn-in board which can set a protecting voltage value according to the requirements of the design. The present invention ensures that the output voltage V, does not exceed the set protecting voltage value and prevents the IC and other components on the burn-in board from damage.

To achieve the foregoing and other objectives and in accordance with the purpose of the present invention, the present invention provides a burn-in board of an overvoltage protector which has a voltage input that receives an input voltage and a voltage output that transmits out an output voltage. The voltage input and voltage output of the overvoltage protector both comprise a first end and a second end, wherein the second end of the voltage input is coupled to the second end of the voltage output. The overvoltage protector further comprises: a fuse that has a first end coupled to the first end of the voltage input and a second end coupled to the first end of the voltage output; a first storage device, which has a first end coupled to the first end of the voltage output and a second end coupled to the second end of the voltage output; a gate controlling switch, comprising a source, a drain and a gate, wherein the source is coupled to the first end of the voltage output and the drain is coupled to the second end of the voltage output; a resistor that has a first end coupled to the first end of the voltage output and a second end coupled to the gate control switch; and a second storage device that has a first end coupled to the first end of the voltage output and a second end coupled to the second end of the voltage output.

The present invention provides another burn-in board of an overvoltage protector, which has a voltage input that receives an input voltage and a voltage output that transmits an output voltage. The voltage input and voltage output of the overvoltage protector both comprise a first end and a second end, wherein the second end of the voltage input is coupled to the second end of the voltage output. The overvoltage protector further comprises: a breaker fuse that has a first end coupled to the first end of the voltage input and a second end coupled to the first end of the voltage output; a first capacitor, which has a first end coupled to the first end of the voltage output and a second end coupled to the second end of the voltage output; a gate controlling switch comprising a source, a drain and a gate, wherein the source is coupled to the first end of the voltage output and the drain is coupled to the second end of the voltage output; a resistor that has a first end coupled to the first end of the voltage output and a second end coupled to the gate control switch; and a second capacitor that has a first end coupledg to the first end of the voltage output and a second end of the second capacitor coupled to the second end of the voltage output.

It is to be understood that both the foregoing general description and the following detailed description are exemplary, and are intended to provide further explanation of the invention as claimed.

DESCRIPTION OF THE PREFERRED EMBODIMENTS

Figure 1:
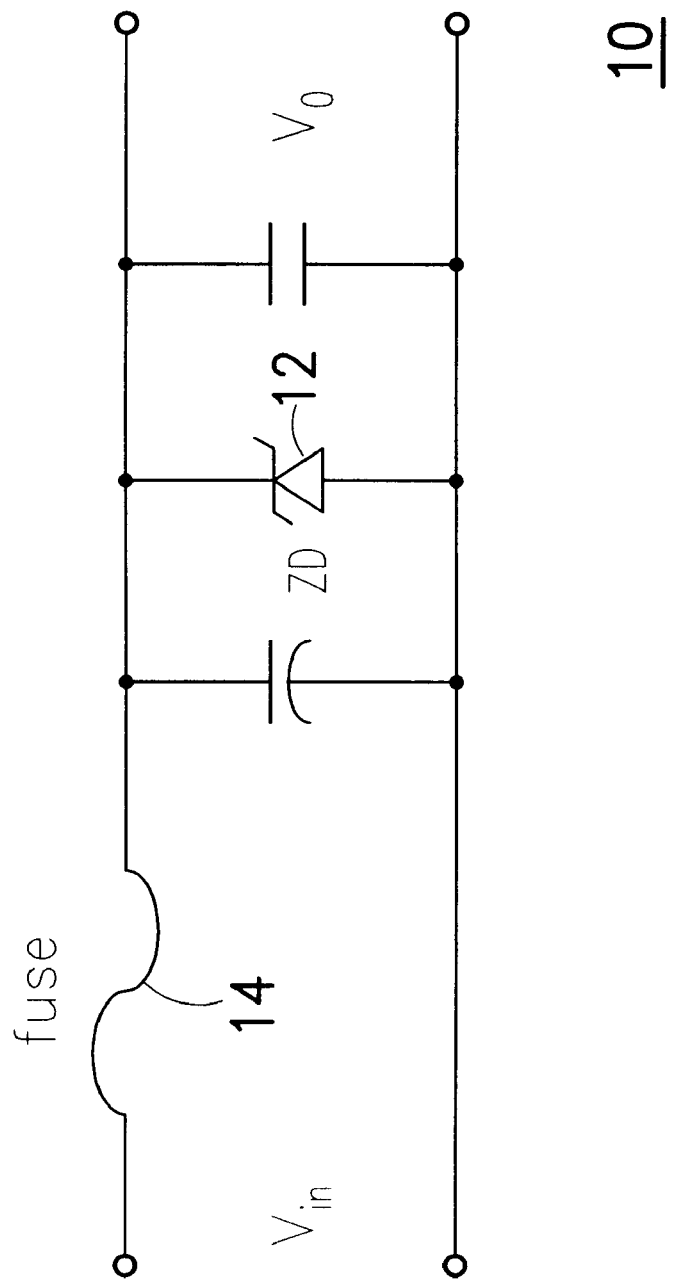
FIG. 1 is a circuit diagram of an overvoltage protector of a burn-in board in accordance with a conventional method.
Figure 2:
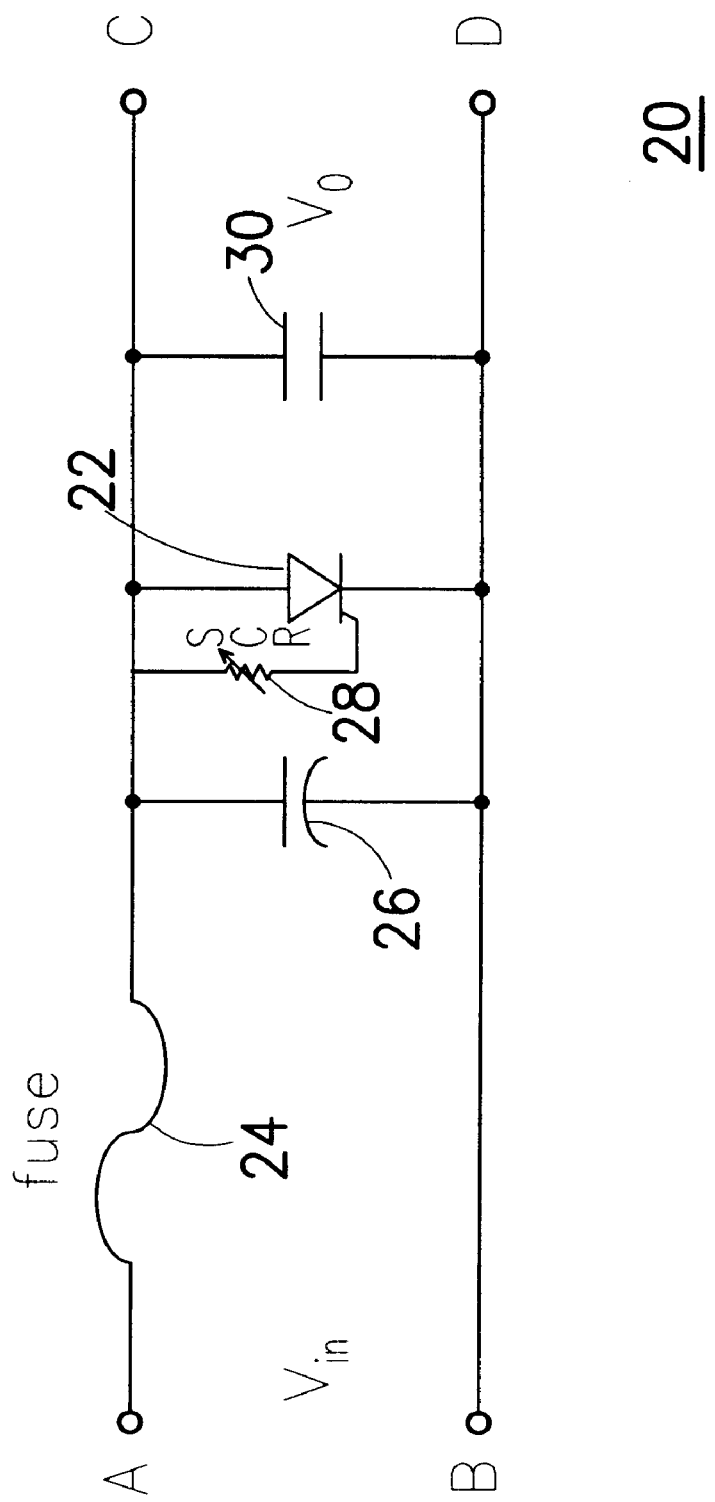
FIG. 2 is a circuit diagram of an overvoltage protector of a burn-in board in accordance with a preferred embodiment of the present invention.

FIG. 2 is a circuit diagram of an overvoltage protector of a burn-in board in accordance with a preferred embodiment of present invention.

A voltage input A and a voltage input B of the burn-in board of the overvoltage protector 20 receive an input voltage $V_{in}$. A voltage output C and a voltage output D of the overvoltage protector of the burn-in board transmit an output voltage $V_o$. The voltage input B of the overvoltage protector 20 of the burn-in board is coupled to the voltage output D. The overvoltage protector 20 of the burn-in board comprises a fuse 24, a capacitor 26, a resistor 28 (an adjustable device), a silicon-controlled rectifier (SCR) 22 and a capacitor 30.

An end of the fuse 24 is coupled to the voltage input A, and another end of the fuse 24 is coupled to a voltage output C. The fuse 24 can be an overvoltage protection fuse or a breaker fuse such as a polyswitch. An end of the capacitor 26 is coupled to the voltage output C and another end of the capacitor 26 is coupled to the voltage output D. The SCR 22 comprises a source end, a drain end and a gate. The source end of the SCR 22 is coupled to the voltage output C and the drain end of the SCR 22 is coupled to the voltage output D. An end of the resistor 28 is coupled to the voltage output C and another end of the resistor 28 is coupled to the gate of the SCR 22. An end of the capacitor 30 is coupled to the voltage output C, and another end of the capacitor 30 is coupled to the voltage output D.

The overvoltage protector that is used for the burn-in board of the present invention is a combination of devices of the SCR 22, the resistor 28 and the overvoltage protection fuse 20. When the voltage $V_{in}$ of the voltage input appears to be over voltage, it will cause the direct voltage $V_o$ of the voltage output to exceed the IC limit of the designated voltage on the burn-in board. Thus the gate of the SCR 22 will be triggered to allow the high current to flow through SCR 22. Since the fuse 24 is coupled to the SCR, the high current will flow through fuse 24 as well, and because the high current exceeds the designated current limit, the fuse will then be damaged to cause an open circuit. This protects the devices and the burn-in board from damage by the excess direct voltage $V_o$.

Referring to FIG. 2, the resistor 28 can be adjusted; thus, the voltage of triggering the gate of the SCR can be controlled to set up a suitable voltage value for protecting the circuit. Thus, the IC of the burn-in board and the devices can be protected from damage.

Referring to FIG. 2, if a breaker fuse such as a polyswitch is used and coupled to the SCR 22 in the circuit, when the circuit experiences a suddenly increasing voltage that exceeds the designated limit, the breaker fuse will protect the circuit by breaking off the circuit to allow the excess voltage to flow out. Once the voltage drops below the designated limit, the breaker fuse can reconnect to the circuit connection. The direct voltage $V_o$ of output will return to its original value.

The main characteristic of the present invention is to provide an overvoltage protector of a burn-in board, which combines an adjustable resistor and a SCR to set up a suitable voltage protecting value. The present invention controls the direct voltage of the output, so that if an excess voltage occurs, the IC and the components on the burn-in board will not be damaged.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An overvoltage protector of a burn-in board, the overvoltage protector having a voltage input that receives an input voltage and a voltage output that transmits out an output voltage, wherein the voltage input and voltage output both have a first end and a second end, wherein the second end of the voltage input is coupled to the second end of the voltage output, the overvoltage protector comprising:

a fuse, wherein a first end of the fuse is coupled to the first end of the voltage input, and a second end of the fuse is coupled to the first end of the voltage output;

a first storage device, wherein a first end of the first storage device is coupled to the first end of the voltage output and a second end of the first storage device is coupled to the second end of the voltage output;

a gate controlling switch comprising a source, a drain and a gate, wherein the source is coupled to the first end of the voltage output and the drain is coupled to the second end of the voltage output;

a resistor, wherein a first end of the resistor is coupled to the first end of voltage output and a second end of the resistor is coupled to the gate control switch; and a second storage device, wherein a first end of the second storage device is coupled to the first end of the voltage output, and a second end of the second storage device is coupled to the second end of the voltage output.

2. The overvoltage protector of the burn-in board of claim 1, wherein the fuse is an over voltage protection fuse.

3. The overvoltage protector of the burn-in board of claim 2, wherein the gate controlling switch is a silicon-controlled rectifier (SCR).

4. The overvoltage protector of the burn-in board of claim 2, wherein the resistor is a precise adjustable resistor.

5. The overvoltage protector of the burn-in board of claim 4, wherein the first storage device and the second storage device is a capacitor.

6. An overvoltage protector of a burn-in board, the overvoltage protector having a voltage input that receives an input voltage and a voltage output that transmits out an output voltage, wherein the voltage input and voltage output both have a first end and a second end, wherein the second end of the voltage input is coupled to the second end of the voltage output, the overvoltage protector comprising:

a breaker fuse, wherein a first end of the breaker fuse is coupled to the first end of the voltage input, and a second end of the breaker fuse is coupled to the first end of the voltage output;

a first capacitor, wherein a first end of the first capacitor is coupled to the first end of the voltage output and a second end of the first capacitor is coupled to the second end of the voltage output;

a gate controlling switch comprising a source, a drain and a gate, wherein the source is coupled to the first end of the voltage output and the drain is coupled to the second end of the voltage output;

a resistor, wherein a first end of the resistor is coupled to the first end of voltage output and a second end of the resistor is coupled to the gate control switch; and a second capacitor, wherein a first end of the second capacitor is coupled to the first end of the voltage output and a second end of the second capacitor is coupled to the second end of the voltage output.

7. The overvoltage protector of the burn-in board of claim 6, wherein the breaker fuse is a polyswitch.

8. The overvoltage protector of the burn-in board of claim 7, wherein the gate controlling switch is a SCR.

9. The overvoltage protector of the burn-in board of claim 8, wherein the resistor a precise adjustable resistor.

* * * * *